(12) United States Patent
Weston et al.

(10) Patent No.: US 7,656,462 B2
(45) Date of Patent: Feb. 2, 2010

(54) SYSTEMS AND METHODS FOR MODIFYING MASTER FILM FOR VIEWING AT DIFFERENT VIEWING LOCATIONS

(76) Inventors: Martin Weston, 7B Weston Road, Petersfield, Hampshire GU31 4JF (GB); Prinyar Boon, 117 Berkeley Avenue, Reading, Berkshire RG1 5HS (GB)

(*) Notice: Subject to any disclaimer, the term of this patent is extended or adjusted under 35 U.S.C. 154(b) by 682 days.

(21) Appl. No.: 11/154,942

(22) Filed: Jun. 17, 2005

(65) Prior Publication Data

US 2006/0288400 A1 Dec. 21, 2006

(51) Int. Cl.
*H04N 5/222* (2006.01)
*H04N 7/16* (2006.01)

(52) U.S. Cl. .................... 348/722; 725/144

(58) Field of Classification Search .......... 348/722, 348/554, 555, 469, 673, 678, 97, 104; 725/32, 725/35, 144–147; 715/723–726; 386/4, 386/52

See application file for complete search history.

(56) References Cited

U.S. PATENT DOCUMENTS

| | | | | |
|---|---|---|---|---|
| 4,418,358 A * | 11/1983 | Poetsch et al. | ............... | 358/506 |
| 4,689,683 A * | 8/1987 | Efron | ......................... | 348/722 |
| 5,412,773 A * | 5/1995 | Carlucci et al. | ............. | 715/723 |
| 5,874,988 A * | 2/1999 | Gu | .............................. | 348/97 |
| 5,959,696 A * | 9/1999 | Hwang | ....................... | 348/678 |
| 6,317,153 B1 * | 11/2001 | Fasciano | ..................... | 348/177 |
| 6,400,411 B1 * | 6/2002 | Bayes et al. | ................ | 348/572 |
| 6,504,552 B2 * | 1/2003 | Phillips | ...................... | 715/726 |
| 6,542,202 B2 * | 4/2003 | Takeda et al. | ............... | 348/678 |
| 6,675,210 B1 * | 1/2004 | Takeo et al. | ................. | 709/224 |
| 6,771,323 B1 * | 8/2004 | Dean et al. | .................. | 348/722 |
| 7,053,927 B2 * | 5/2006 | Jones et al. | .................... | 348/97 |
| 7,280,738 B2 * | 10/2007 | Kauffman et al. | ............. | 386/52 |
| 7,333,154 B2 * | 2/2008 | Dean et al. | .................. | 348/722 |
| 2003/0081117 A1 * | 5/2003 | Bogdanowicz et al. | ........ | 348/97 |
| 2003/0081118 A1 * | 5/2003 | Cirulli et al. | ................ | 348/104 |
| 2003/0206635 A1 * | 11/2003 | Morley et al. | ............... | 380/269 |
| 2005/0280842 A1 * | 12/2005 | Rodriguez et al. | ........... | 358/1.5 |
| 2006/0015927 A1 * | 1/2006 | Antonellis et al. | .......... | 725/145 |
| 2006/0023233 A1 * | 2/2006 | Madden | ...................... | 358/1.9 |
| 2007/0211074 A1 * | 9/2007 | Yeung | ......................... | 345/604 |
| 2007/0245386 A1 * | 10/2007 | Morley et al. | ................. | 725/78 |
| 2007/0291179 A1 * | 12/2007 | Sterling et al. | .............. | 348/642 |

* cited by examiner

*Primary Examiner*—Victor R Kostak
(74) *Attorney, Agent, or Firm*—Knobbe, Martens, Olson & Bear LLP

(57) ABSTRACT

This invention concerns a system for the distribution of films by electronic means, and in particular, for ensuring a director's intended rendition of the images is attained in differing viewing conditions and technologies. Thus master data enabling the luminance and chromaticity of every part of every frame as previously displayed in a first display environment to be determined may be modified to achieve a similar subjective effect in a second display environment, the modification depending for example on data characterizing the said second display environment.

15 Claims, 5 Drawing Sheets

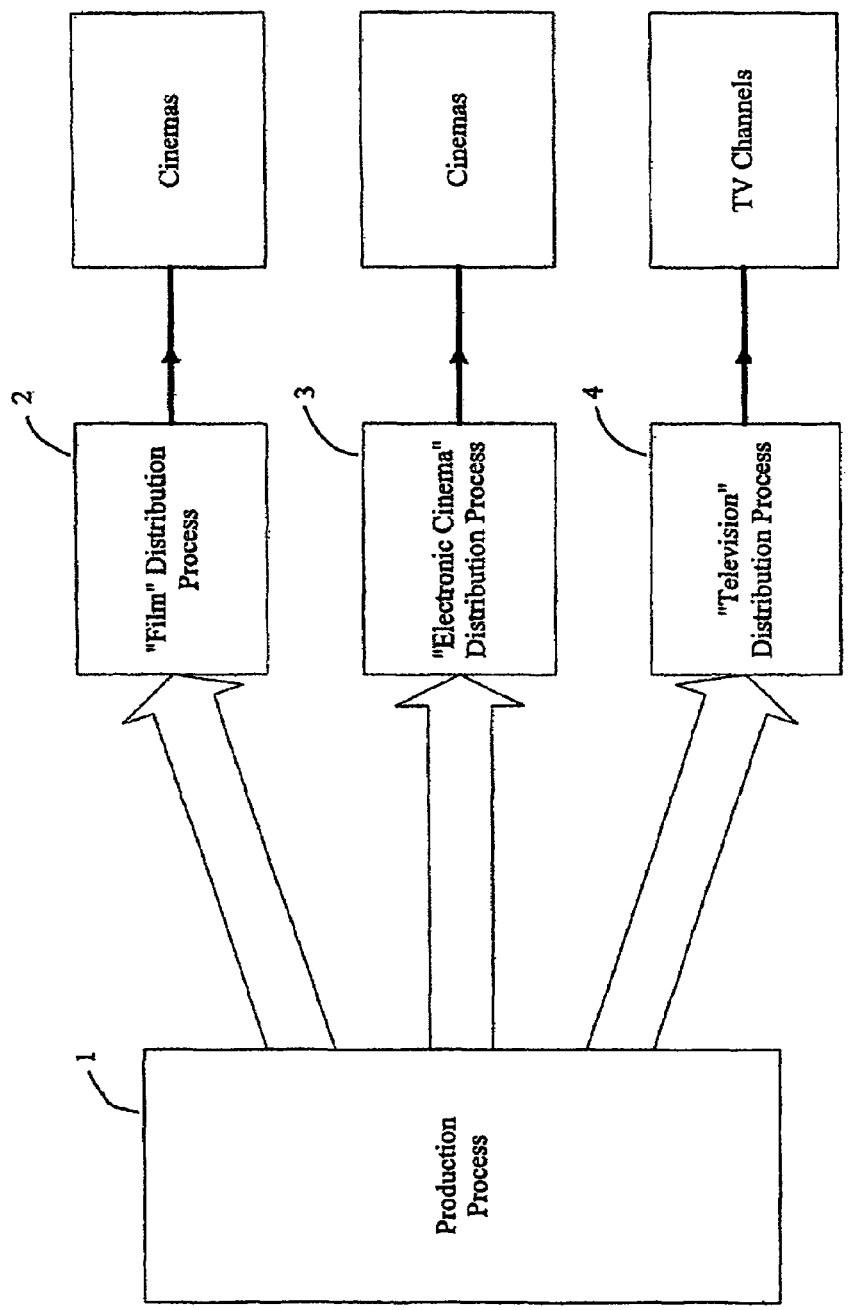
Figure 1: Production and Distribution Process

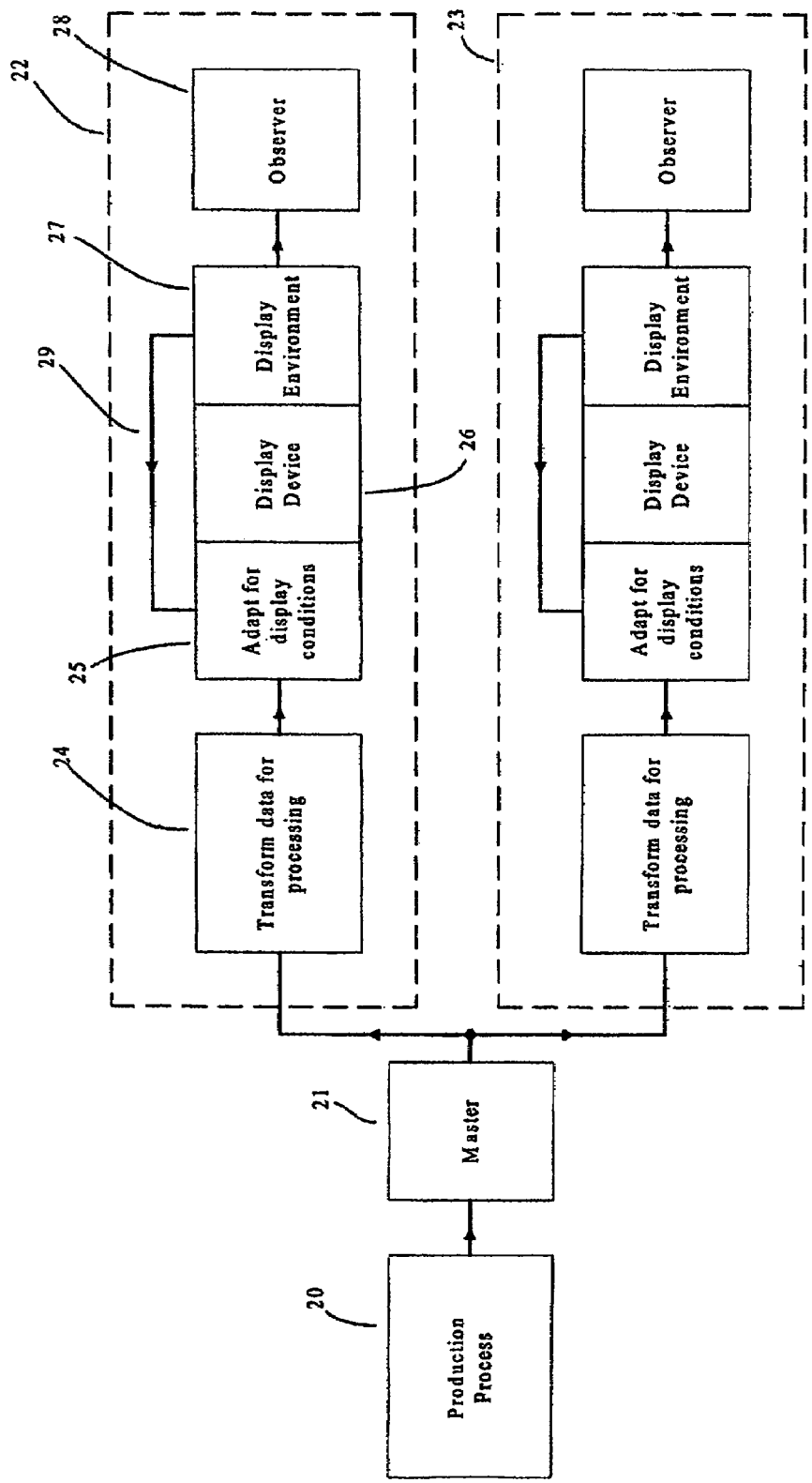
Figure 2: Improved Production & Distribution Process

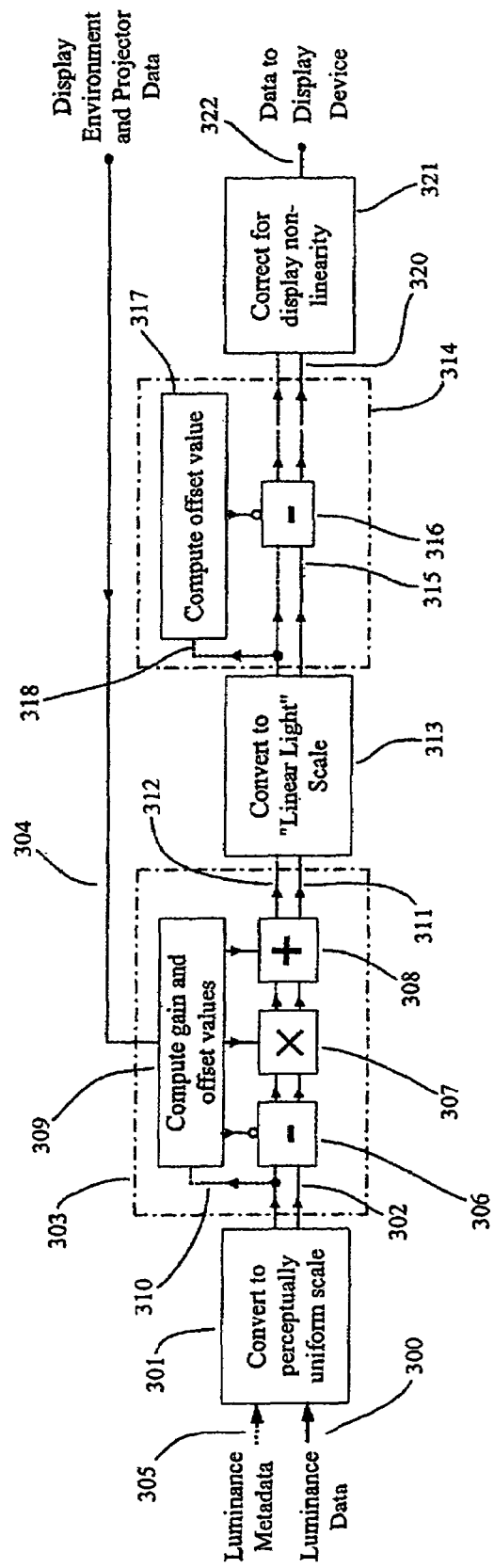
Figure 3: Lowlight Correction System

SYSTEMS AND METHODS FOR MODIFYING MASTER FILM FOR VIEWING AT DIFFERENT VIEWING LOCATIONS

FIELD OF THE INVENTION

This invention concerns a system for the distribution of films by electronic means, and in particular, for ensuring a director's intended rendition of the images is attained in differing viewing conditions and technologies.

BACKGROUND OF THE INVENTION

A vital part of the production of cinema films is the "grading" process in which the exposure and colour balance of a "master" print are determined and agreed by the creative team. Subsequent processes, including distribution and final exhibition to an audience, should not change the appearance, or "look" that was decided upon at the conclusion of the grading process.

It is now becoming common for electronic methods of image storage and processing to be used in at least part of the film production process; and there is considerable interest in the use of electronics for distribution and for exhibition, using projectors where the image is generated electronically by a "light-valve" rather than from a transparent film medium.

For historical and other reasons relating to the development of television technology, the methods of working in television production and distribution are very different from those used for cinema film production and distribution. In particular, in television, it has been more usual for the "look" of the image to be decided at the time of acquisition in the camera, with only limited modification during the subsequent production processes. The technological limitations which led to this method of working are now becoming less stringent as a result of developments in electronic camera and image processing technology.

It is also now possible to use both electronic and photochemical processes at different stages in the production of the same film. The great flexibility offered by modern electronic image processing has potential benefits for film makers, but they need methods of working and systems which ensure that the electronic tools are used in a controlled and acceptable manner.

One area where electronic processing can help film makers is in simplifying the creation of "versions" of a film to be shown in different conditions and by different display technologies. Distribution processes can be defined which are guaranteed to have a small effect on the appearance of the images. It should then be possible to agree that in certain circumstances these processes can be used with less stringent requirements for review by the director.

FIG. 1 is a conceptual diagram of a film production and distribution process. A production process (1) feeds three distribution processes, each intended for a different display method. The film process (2) produces film prints for exhibition in cinemas; the electronic-cinema process (3) produces data for electronic projectors in cinemas; and the TV process (4) produces video data (usually on tape) which is distributed to TV sets.

The route through production (1) to film distribution (2) is well known, and will involve a grading process to determine an agreed exposure and colour balance, as indicated above, whose result will be checked by being projected in a reviewing cinema under controlled viewing conditions.

The inputs to the routes (3) and (4) could be obtained by scanning the graded film of route (2), or, possibly by taking information from earlier in the production process. There is no certainty that the end result will have the same "look" that was chosen in the reviewing cinema. This is so even if the graded film is scanned in a telecine since the process of colorimetric analysis in the telecine and presentation via an electronic display is almost certain to introduce errors.

The visual experience in the reviewing cinema will depend on the amount of stray light in that cinema and the way that light from bright parts of the image contaminates dark parts of the image (flare). Even in the cinemas at the end of the route (2), the viewing experience will probably be different from that in the reviewing cinema, because the level of stray light is unlikely to be the same (it is probably higher).

SUMMARY OF THE INVENTION

The inventors have appreciated that there is a novel system which can minimise the differences between the viewing experience in the review cinema and the viewing experience in the final viewing environment, which better enables the director's intended rendition of the images to be attained in differing viewing conditions and technologies.

In accordance with a first aspect of the present invention there is provided a method of generating film data for display wherein master data enabling the luminance and chromaticity of every part of every frame as previously displayed in a first display environment to be determined is modified to achieve a similar subjective effect in a second display environment, the said modification depending on data characterising the said second display environment.

In accordance with a second aspect of the present invention there is provided an apparatus for generating film data for display, comprising means for modifying master data enabling the luminance and chromaticity of every part of every frame as previously displayed in a first display environment to be determined, to achieve a similar subjective effect in a second display environment, the said modification depending on data characterising the said second display environment.

In accordance with a third aspect of the present invention there is provided a method of recording the output of a film production process in the form of master data enabling the luminance and chromaticity of every part of every frame as previously displayed in a particular display environment to be determined.

In accordance with a fourth aspect of the present invention there is provided film master data enabling the luminance and chromaticity of every part of every frame as previously displayed in a particular display environment to be determined.

In accordance with a fifth aspect of the present invention, there is provided a method of changing the contrast range of a film or television image by coding the said image in a perceptually uniform way, resealing the coded data, converting the rescaled data into the "linear light" domain and adding or subtracting a constant value.

In accordance with a sixth aspect of the present invention, there is provided an apparatus for changing the contrast range of a film or television image, comprising: coding means for coding the said image in a perceptually uniform way; resealing means for rescaling the coded data; converting means for converting the rescaled data into the "linear light" domain; and means for adding or subtracting a constant value.

In accordance with a seventh aspect of the present invention there is provided a display apparatus comprising means for receiving image data and apparatus for generating film data for display in accordance with the invention.

In accordance with a eighth aspect of the present invention, there is provided a display apparatus comprising means for receiving image data and apparatus for changing the contrast range of a film or television image in accordance with the invention.

In accordance with a ninth aspect of the present invention, there is provided a program carrier storing processor-implementable instructions for carrying out a method of the invention.

In this specification the term "film" is intended to denote a sequence of images intended to form an artistic whole, or part of an artistic whole.

BRIEF DESCRIPTION OF THE DRAWINGS

Examples of the invention will now be described with reference to the drawings in which:

FIG. 1: shows three known film production and distribution processes

FIG. 2: shows an improved production and distribution process according to an embodiment of the invention.

FIG. 3: shows a lowlight correction system.

DETAILED DESCRIPTION OF THE INVENTION

Figure 4A:
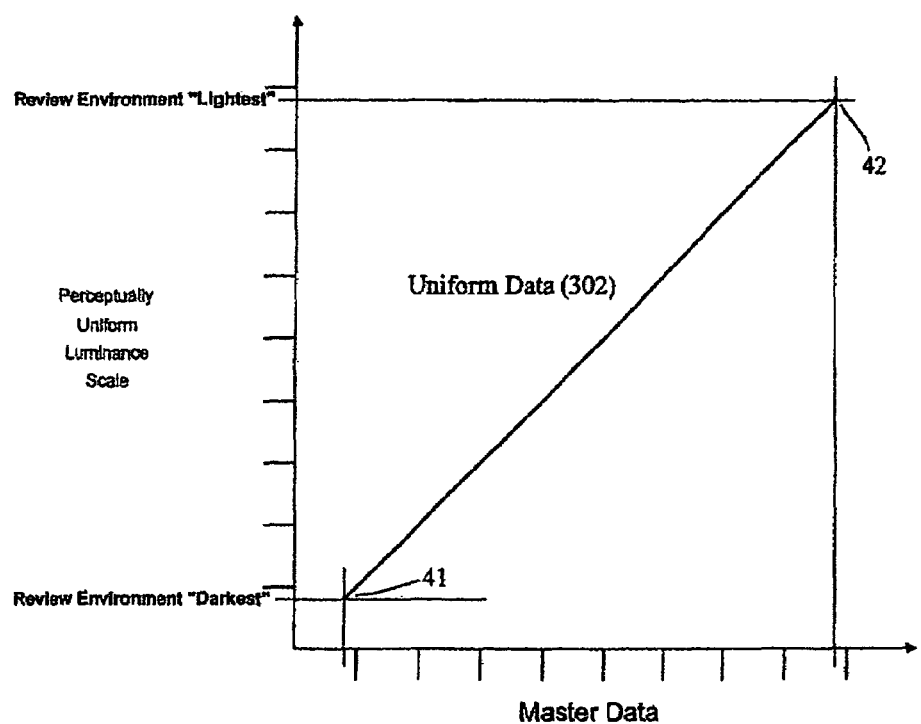
FIGS. 4a, 4b and 4c: show the relationship between input data values and processed data values at three points in the system of FIG. 3.

An exemplary embodiment of the invention is shown in FIG. 2. A production process (20) results in an electronic master data set (master) (21). This master is a record of the actual screen luminance and chromaticity of every part of every frame of the film as seen and approved by the director in the review cinema. For example the frames may be sampled as pixels and appropriate tristimulus calorimetric values recorded for each pixel of each frame.

These values could be obtained by direct measurement of the light from the screen in the actual viewing environment when the film was reviewed. However it may be more convenient to characterise the combination of display device (e.g. the projector) and the environment by displaying (in the review cinema) suitable test material having a known relationship to the graded film and then computing the displayed tristimulus values from analysis of that film (perhaps by scanning it in a suitable telecine machine).

An alternative embodiment of the master (21) is a record of the input to the review display device together with metadata to enable the combination of the review display device and the review environment to be modelled so that the actual displayed light can be calculated from the record of the review display device input and the metadata.

Other methods of obtaining the master (21) will be apparent to those skilled in the art; however, the essential feature is that the master enables the absolute luminance and chromaticity of the review screen to be determined. The data may be stored in digital form, and if so it is highly desirable that the word lengths and coding method are chosen such that the differences between adjacent quantisation levels are imperceptible to an observer.

The existence of the master (21) facilitates the exhibition of the film via alternative technologies. If an alternative distribution and display technology is designed so as to minimise the difference between the subjective appearance of the alternative display and the recorded master, the need for the director to review the alternative version can be reduced. (For example, only a few critical scenes need be reviewed).

FIG. 2 shows two different distribution routes (22) and (23); for example, these could be an electronic cinema route and a TV route. Considering the route (22), there is a data transformation block (24), followed by a display conditions adaptation block (25), and a display device block (26). The subjective effect of the display depends on the viewing conditions and on the psychovisual response of the observer; these are represented in the Figure by the blocks (27) and (28) respectively. The same functions are present in the route (23).

The blocks (24) to (28) will now be considered in turn.

The data transformation block (24) converts the screen luminance and chromaticity values into the required form to drive the display device (26); this may, for example, involve a change in colour space (e.g. from X Y Z or Y' U' V' to R G B). This format conversion does not change the luminance and chromaticity values in the master (21), its sole purpose is to make the data compatible with the display device (26).

Preferably the subsequent processing is performed identically on the primary colour component signals (e.g. R G and B) that are used by the display device (26). However, in order to save processing complexity the data may be handled in a form in which there is an explicit luminance value (e.g. Y U V), and the processing applied to the luminance component only. The processed data may then be converted to the relevant primaries for the display device at the end of the process.

The display conditions adaptation block (25) corrects for the display environment (27), and therefore requires information about that environment (shown by the information flow (29)). In addition, it may also be desirable to provide information from display device (26) to the display conditions adaption block (25), not shown. An example of the operation of the block (25) will be described in more detail below.

The display device (26) converts the corrected data from the display conditions adaption block (25) into an optical image in the display environment (27) suitable for viewing by the observer (28). Examples of possible display devices (26) include the combination of a projector and a screen; or a cathode-ray-tube display device.

The display environment block (27) represents the way in which the image displayed by the display device (26) is modified by the environment, including the effect of other light in the room and the psychovisual effect of the surroundings on the observer (28).

The individual distribution chains (22) and (23) are designed so that the psychovisual effect on the final ("exhibition") observer is as close a possible to that of an observer in the review cinema, where the luminance and chromaticity values of the master (21) were present. In order to achieve this, it is necessary to take note of the way in which a human observer responds to the image displayed by the display device (26) as modified by the display environment (27).

As mentioned above, it is not uncommon for the stray light level in the display environment (27) to be greater than that which was present in the review cinema, which has the effect of making darker parts of the image less visible. However, by suitable design of the display conditions adaption block (25) this subjective difference can be reduced significantly.

An example of a display conditions adaptation block (25) is shown in FIG. 3. The arrangement shown in FIG. 3 corrects for the difference between the minimum display luminance in the review cinema and the minimum display luminance in the actual viewing environment.

In the exemplary embodiment, input luminance data (300) is received from the data transformation process (the block (24) of FIG. 2), or directly from the distribution master (21) if the data is already in a suitable form for processing. Alternatively, component brightness data may be used instead of the luminance data as shown in the exemplary embodiment.

It is preferable for colour components to be processed because the chromaticity change resulting from the lowlight correction is minimised. When lowlight correction is applied to a luminance signal, and the associated chrominance is not altered, a small loss of saturation occurs when the lowlight contrast is increased; however this effect may be sufficiently small to enable luminance only processing to be used in some applications.

In the exemplary embodiment the luminance (or component brightness) data is coded in a perceptually uniform way. This means that a "just noticeable difference" in displayed luminance is represented by the same difference in data values. As the eye is better able to discern differences at low luminance levels, perceptually uniform luminance data will be coded on a scale which is expanded towards the lower levels.

There are many different ways in which luminance or component brightness data can be coded in a perceptually uniform way. One example is a scale in which luminance values are raised to a power of 1/n before coding. n may preferably be selected to be between 2 and 3, and most preferably may be selected to be 2.6. The maximum gradient of the slope 1/n may be limited to a specified number, for example 5. Another method is to add a small constant and take the logarithm of the result. Alternatively a suitable perceptually uniform coding may be obtained from the CIE (Commission Internationale de l'Eclairage)1976 recommendations for L*.

If the data (300) is not already coded on a perceptually uniform scale, it is converted to such a scale by the block (301).

The uniform data (302) is modified in the process (303) to increase the minimum luminance value to that corresponding to the minimum luminance value that can be displayed in the viewing environment. The required value is obtained from knowledge of the display environment (27) as shown by the information flow (304) (equivalent to (29) in FIG. 2). It may also be helpful for the process (303) to adjust the maximum luminance value to correspond to the highest value that can be displayed in the viewing environment; however it is common for "white" levels of display systems to be standardised, thus making this unnecessary. (The reduced visibility of small differences between high luminance levels also reduces the necessity for this.)

The process (303) (and subsequent processes) may be facilitated if the input data (300) is accompanied by metadata (305) giving the maximum and minimum luminance values in the data (300). This original metadata can accompany the data through the various processing stages and may have values appended to it which show how the original metadata values are changed by the processing which the data (300) has undergone. In certain embodiments, maximum and minimum luminance values may refer to a single image of a sequence. In other embodiments, maximum and minimum values may be indicative of a plurality of images, such as a single scene.

The process (303) operates as follows: A subtractor (306) subtracts the maximum input luminance value (possibly obtained from the metadata (310)) so that "peak white" has a data value of zero. A multiplier (307) then linearly re-scales the data values to correspond to the maximum contrast possible in the display environment; and, an adder (308) adds a constant so as to restore the data range to the range of luminance values that can be displayed in the environment. The data (311) at the output of the process (303) thus comprises a representation (on a perceptually uniform scale) of luminance values that will be displayed and that have been adjusted to compensate for differences between the review cinema and the display environment.

The necessary inputs to the subtractor (306) multiplier (307) and adder (308) blocks are determined by the block (309) from data (304) about the display environment and from the maximum and minimum luminance levels in the master data (300), which may conveniently be obtained from metadata (310). In this example the data (304) includes the minimum and the maximum luminance values which can be displayed by the projector in the viewing environment.

The processed output data (311) can be accompanied by metadata (312) giving, at least, processed minimum and maximum luminance levels and possibly other data.

Usually the available contrast range in the viewing environment will be less than that recorded on the master and so the process (303) will contract the range of the data. However it may be that a wider contrast range is available in the viewing environment, perhaps the stray light level is lower than that in the review cinema, or the highest possible "white" is brighter. In this case the process (303) could expand the data range if the director agrees that it is appropriate in this situation.

The block (313) transforms the data (311) from a perceptibly uniform scale to a linear scale where data values are proportional to actual luminance values (e.g. $cd/m^2$). This is the inverse of the block (301), or its equivalent at an earlier point in the data chain.

This could be done, for example, by raising perceptually uniform data to a power of 2.6. Alternatively, "linear light" data may be obtained by applying an exponent to the perceptually uniform data and subtracting a constant. Other methods will be apparent to a skilled person depending upon the methods of generating the perceptually uniform data as discussed above.

The data (315) represents the actual luminance or colour component values in the display environment, and therefore includes the luminance due to the stray light in that environment. This contribution must be removed before the data is input to the display device so that the lowest luminance data value is zero. This is achieved by the process (314) in which the "linear light" data (315), from the block (313), is offset by a constant factor in the subtractor (316).

The constant to be subtracted is determined by the block (317) which extracts the minimum luminance value in the data (315) from the metadata (318). (If suitable metadata is not available a minimum value could be extracted directly from the data (315).)

The processed data (320) is ready for use by a display device having a light output proportional to its input data values. However, if a display device having a non-linear transfer characteristic (such a cathode-ray-tube) is to be used, a suitable correction is applied in the block (321). The output data (322) drives the display device (e.g. the block (26) of FIG. 2.)

It must be emphasised that the correction (321) depends only on the characteristic of the actual display device. The non linear function is unrelated to the complementary non-linear processes (301) and (303), which may be different from a non-linear coding scheme used to represent the data (300). However, in practice, these non-linear characteristics may be very similar.

The data modification by the correction process shown in FIG. 3 will now be explained with reference to FIGS. 4a to 4c. These figures shows the relationship between luminance data values (300) in the master and luminance data values at subsequent points in the data chain.

FIG. 4a represents the perceptually uniform luminance data (302) at the input to the process (303). The lowest data value (41) corresponds to the lowest luminance value displayed in the review cinema; this does not correspond to zero luminance because there was some light in even the darkest parts of the screen and the director may have chosen not to exploit the full range available in the review cinema. The highest data value (42) corresponds to the highest luminance value displayed in the review cinema.

Figure 4B:
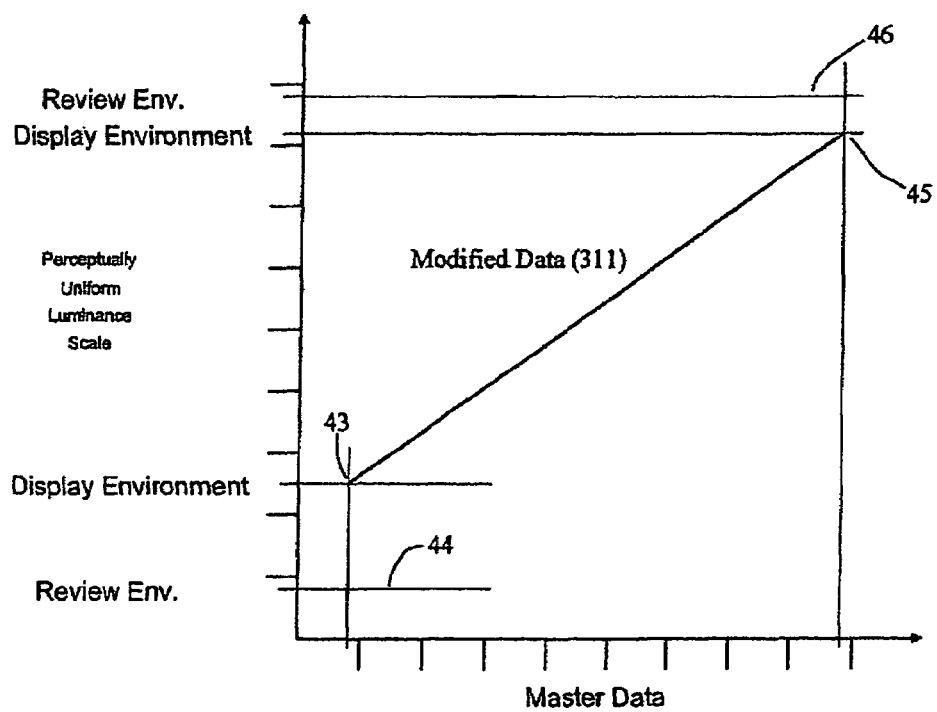

FIG. 4b shows the data (311) at the output of the process (303). The lowest luminance value (43) now corresponds to the lowest luminance that can be displayed in the display environment, which, in this example, is higher than the lowest value (44) that was displayed in the review cinema. The highest data value (45) now corresponds to the highest possible value in the display environment, which, in this example, is lower than the highest value (46) that was displayed in the review cinema.

Figure 4C:
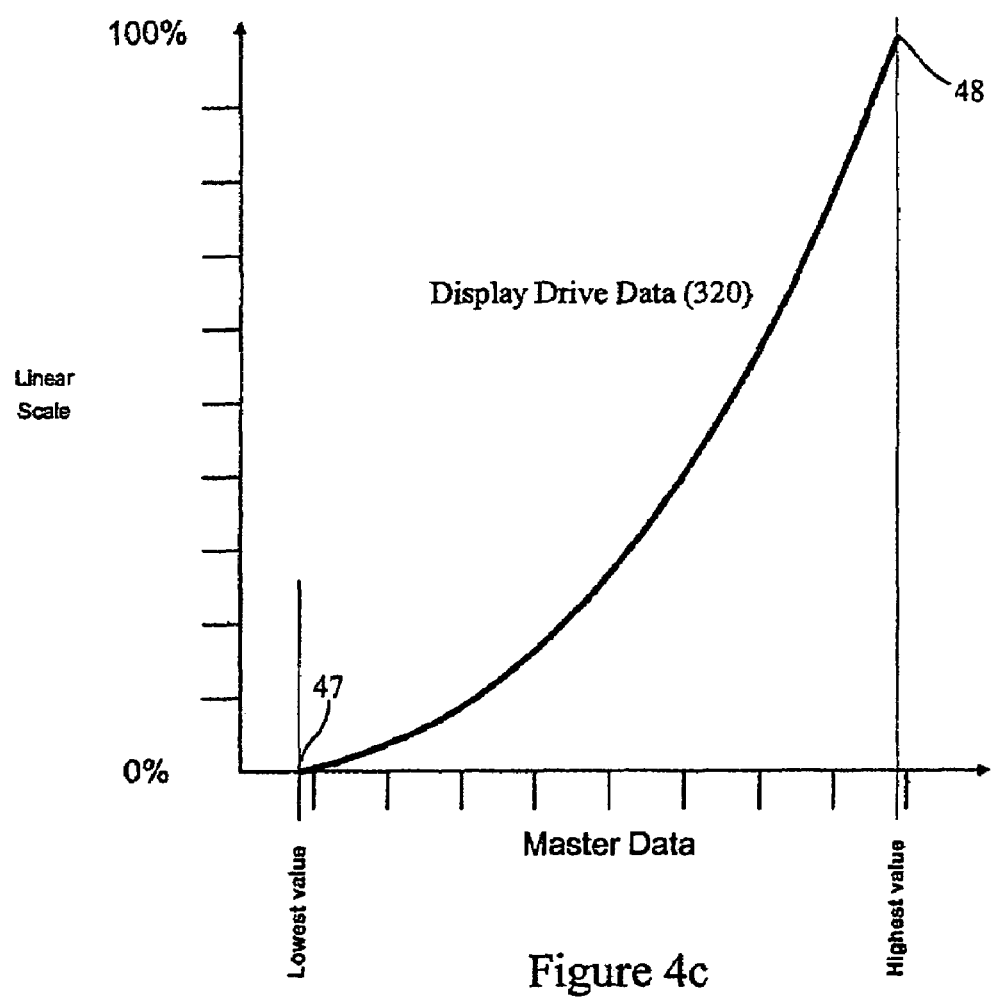

FIG. 4c shows the data (320) at the output of the process (314). This data is suitable to drive a display device having a linear transfer characteristic. The lowest data value (47) turns the display device "fully off" (0% display drive) and the highest data value (48) corresponds to turning the display device "fully on" (100% display drive). The shape of the characteristic will depend on the chosen perceptually uniform coding scheme (applied in the block (301), and reversed in the block (313)); the slope of the characteristic is shallower at low light levels because of the greater visibility of luminance differences at low levels. However, the slope of the characteristic has been increased at low levels so as to reproduce as closely as possible the visibility of lowlight detail as seen in the review cinema, in spite of the higher level of stray light in the display environment.

When the display device responds to the data (320) as shown in FIG. 4c, the subjective effect on an observer will correspond to FIG. 4b; when the display device is "off" the stray light will provide a luminance level equivalent to (43) in FIG. 4b, and when fully "on" the luminance will be equivalent to (45) in FIG. 4b. The gradation of intermediate luminance values will be uniform because the resealing of the contrast ratio by the multiplier (307) has been performed in a perceptually uniform domain, taking account of the background light level in the display environment.

If, however it were considered necessary to have a non-uniform modification of the contrast range, a suitable non-linear characteristic could inserted before or after the multiplier (307).

Alternative embodiments of the invention are possible and some of these are described below.

As mentioned above, the difference in maximum displayed luminance can be ignored so that the process (303) can be simplified to a "gain-compensated lift (sit)" adjustment where data values lower than the maximum value are adjusted (typically increased to compensate for more stray light in the display environment) with the amount of adjustment reducing proportionally to zero at the highest value, which remains unchanged.

As mentioned above the processing may either be applied to a luminance signal or three or more primary colour components could be processed identically.

The process shown in FIG. 3 corrects for a constant amount of stray light. It may be required to apply corrections which are not constant, for example flare in an optical system can be modelled as a picture-content related addition of stray light. A flare model can be used to calculate the flare contribution and the method of the invention can be used to correct the flare. The contrast can be reduced (in a perceptually uniform domain) by an amount proportional to the modelled flare and then the modelled flare can be subtracted in the "linear light" domain to derive flare-corrected data.

The described processes have a one-to-one mapping between input and output values; cascaded processes can therefore be combined into a single process (for example in a look-up-table) or other means of obtaining the described end result.

The inventive concepts described herein may be applied to different aspects of the production and distribution process. For example, in one aspect of the invention the adaption to the display environment takes place in each individual display environment. Thus, for example, a particular cinema set up can be used to provide adaption information (304) to be used for all films to be shown in that cinema: preferably information regarding the display device 26 may also be used. In addition the adaption can be carried out at each receiving television set or other display. Information about the display environment can be measured. In both these situations the master data set is sent for display (either by broadcast or cinema distribution) and adaption takes place locally.

As an alternative, it would also be possible to use the adaption process described herein to create, for example a master specifically for different distribution/viewing situations e.g. cinema, television etc. An estimate of typical display and viewing conditions can then be made, or measured in a test environment and used to adapt the director-approved master data set to the different situations automatically, thus avoiding the need to create separate director-approved masters.

Although the present invention has been described with reference to the exemplary embodiment shown in the accompanying drawings, the inventive concepts described herein are not limited thereto, as will be understood by a skilled person.

The invention claimed is:

1. A method of dynamically adjusting luminance of a cinematic film, the method comprising:
   receiving a master copy of a cinematic film that was viewed at a review cinema at a first luminance level;
   receiving metadata comprising at least a minimum luminance level and a maximum luminance level of the master copy of the cinematic film;
   receiving measurements relating to at least one optical characteristic of a viewing location, wherein the viewing location is different than the review cinema, wherein the at least one optical characteristic comprises one or more of a maximum luminance of the viewing location and a minimum luminance of the viewing location;
   based on at least the at least one optical characteristic and prior to use by a projector associated with the viewing location, modifying the master copy of the cinematic film so that the luminance levels of the modified cinematic film, when viewed at the viewing location, are perceptually substantially the same as the luminance levels of the master copy of the cinematic film, when viewed at the review cinema, such that the modified master copy of the cinematic film may be used by the projector without modification.

2. The method of claim 1, wherein the metadata comprises brightness data.

3. The method of claim 1, wherein the minimum and maximum luminance levels are associated with all frames of the cinematic film.

4. The method of claim 1, wherein the minimum and maximum luminance levels are associated with frames of one or more scenes of the cinematic film.

5. The method of claim 1, further comprising modifying the master copy of the cinematic film so that the chromacity levels of the modified cinematic film, when viewed at the viewing location, are perceptually substantially the same as the chromacity levels of the master copy of the cinematic film, when viewed at the review cinema.

6. The method of claim 1, wherein the at least one optical characteristic comprises one or more of a maximum luminance of the viewing location, a minimum luminance of the viewing location, and a light level at the viewing location.

7. A computerized method of adjusting a master copy of a film for viewing, the method comprising:
  receiving metadata indicating at least one optical characteristic of a master copy of a film as perceived at a first display environment;
  receiving a digital copy of the master copy of the film;
  receiving measurements related to an optical characteristic at the second display environment;
  transforming the digital copy of the master copy of the film in order to form a transformed copy of the film that, when displayed at the second display environment, creates images having respective luminosities that are perceptibly indistinguishable from luminosities of corresponding images of the master copy of the film displayed at the first display environment, wherein the transforming is based at least on the at least one optical characteristic received in the metadata and the measured optical characteristic at the second display environment and occurs prior to use by a display source device associated with the second display environment.

8. The computerized method of claim 7, further comprising receiving at a third display environment the digital copy of the master copy of the film;
  measuring a second optical characteristic at the third display environment;
  transforming the digital copy of the master copy of the film in order to form a second transformed copy of the film that, when displayed at the third display environment, creates images having second respective luminosities that are perceptibly indistinguishable from luminosities of corresponding images of the master copy of the film displayed at the first display environment, wherein the transforming is based at least on the at least one optical characteristic received in the metadata and the measured second optical characteristic at the third display environment.

9. The computerized method of claim 7, wherein said transforming comprises re-scaling luminance data of the master copy of the film based at least on a maximum luminance and/or minimum luminance at the second display environment.

10. The computerized method of claim 7, wherein said transforming comprises re-scaling one or more primary colors of the master copy of the film based at least on a maximum luminance and/or minimum luminance at the second display environment.

11. The computerized method of claim 7, further comprising:
  coding luminance data of the master copy of the film as perceptually uniform data prior to said transforming.

12. The computerized method of claim 7, wherein the film comprise a cinematic film or a television program.

13. The computerized method of claim 7, wherein said transforming is performed on each frame of the film.

14. A system of adjusting a master copy of a film for viewing, the system comprising:
  means for receiving metadata indicating at least one optical characteristic of a master copy of a film as displayed at a first display environment;
  means for receiving at a digital copy of the master copy of a film;
  means for receiving measurements related to an optical characteristic at a second display environment
  means for transforming, prior to use by a display source device associated with the second display environment, the digital copy of the master copy of the film in order to form a transformed copy of the film that, when displayed at the second display environment, has a luminosity that is perceptibly indistinguishable from a luminosity of the master copy of the film displayed at the first display environment.

15. A computerized method of adjusting a master copy of a film for viewing, the method comprising:
  receiving metadata indicating at least one optical characteristic of a master copy of a film as perceived at a first display environment;
  receiving a digital copy of the master copy of the film;
  receiving measurements related to an optical characteristic at the second display environment;
  transforming the digital copy of the master copy of the film in order to form a transformed copy of the film that, when displayed at the second display environment, creates images having respective luminosities that are perceptibly indistinguishable from luminosities of corresponding images of the master copy of the film displayed at the first display environment, wherein the transforming is based at least on the at least one optical characteristic received in the metadata and the measured optical characteristic at the second display environment and occurs prior to use by a projector device associated with the second display environment.

* * * * *

UNITED STATES PATENT AND TRADEMARK OFFICE
CERTIFICATE OF CORRECTION

PATENT NO. : 7,656,462 B2  Page 1 of 1
APPLICATION NO. : 11/154942
DATED : February 2, 2010
INVENTOR(S) : Martin Weston and Prinyar Boon It is certified that error appears in the above-identified patent and that said Letters Patent is hereby corrected as shown below:

At Column 2, Line 54, change "resealing" to --rescaling--.

At Column 2, Line 60-61, change "resealing" to --rescaling--.

At Column 3, Line 19, change "processes" to --processes.--.

At Column 3, Line 36 (Approx.), change "calorimetric" to --colorimetric--.

At Column 5, Line 29, change "Eclairage) 1976" to --Eclairage 1976--.

At Column 7, Line 40, change "resealing" to --rescaling--.

At Column 9, Line 2, in Claim 5, change "chromacity" to --chromaticity--.

At Column 9, Line 5, in Claim 5, change "chromacity" to --chromaticity--.

At Column 10, Line 19, in Claim 14, after "receiving" delete "at".

At Column 10, Line 22, in Claim 14, after "environment" insert --;--.

Signed and Sealed this

Twenty-seventh Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,656,462 B2  Page 1 of 1
APPLICATION NO. : 11/154942
DATED : February 2, 2010
INVENTOR(S) : Martin Weston et al.

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 682 days.

should read (*) Notice: Subject to any disclaimer, the term of this patent is extended or adjusted under 35 U.S.C. 154(b) by 999 days.

Signed and Sealed this

Third Day of August, 2010

David J. Kappos
*Director of the United States Patent and Trademark Office*